(12) United States Patent
Kondoh et al.

(10) Patent No.: US 7,998,448 B2
(45) Date of Patent: *Aug. 16, 2011

(54) AMORPHOUS SILICA AND ITS MANUFACTURING METHOD

(75) Inventors: Katsuyoshi Kondoh, Minoh (JP); Yoshisada Michiura, Izumisano (JP); Junko Umeda, Toyonaka (JP)

(73) Assignees: Kurimoto, Ltd., Osaka (JP); Katsuyoshi Kondoh, Osaka (JP)

( * ) Notice: Subject to any disclaimer, the term of this patent is extended or adjusted under 35 U.S.C. 154(b) by 72 days.

This patent is subject to a terminal disclaimer.

(21) Appl. No.: 12/312,075

(22) PCT Filed: Oct. 17, 2007

(86) PCT No.: PCT/JP2007/070281
§ 371 (c)(1),
(2), (4) Date: Apr. 24, 2009

(87) PCT Pub. No.: WO2008/053711
PCT Pub. Date: May 8, 2008

(65) Prior Publication Data
US 2010/0061910 A1    Mar. 11, 2010

(30) Foreign Application Priority Data
Oct. 27, 2006    (JP) .................. 2006-292838

(51) Int. Cl.
*C01B 33/12* (2006.01)
(52) U.S. Cl. ........................................ 423/335
(58) Field of Classification Search ........... 423/335–340
See application file for complete search history.

(56) References Cited

U.S. PATENT DOCUMENTS

| 6,375,735 | B1 * | 4/2002 | Stephens et al. | 106/600 |
| 6,406,678 | B1 * | 6/2002 | Shipley | 423/335 |
| 2003/0012720 | A1 * | 1/2003 | Victor et al. | 423/335 |
| 2004/0175321 | A1 * | 9/2004 | De Souza et al. | 423/335 |
| 2006/0222582 | A1 * | 10/2006 | Shipley | 423/335 |

FOREIGN PATENT DOCUMENTS

| JP | 5-194007 | 8/1993 |
| JP | 7-57684 | 6/1995 |
| JP | 7-196312 | 8/1995 |
| JP | 8-48515 | 2/1996 |
| JP | 8-94056 | 4/1996 |
| JP | 11-323752 | 11/1999 |
| JP | 2003-71404 | 3/2003 |

(Continued)

OTHER PUBLICATIONS

Chandrasekhar et al. "Review Processing, properties, and applications of reactive silica from rice husk—an overview", Journal of Materials Science 38 (2003) 3159-3168.*
Chandrasekhar et al. "Effect of calcination temperature and heating rate on the optical properties and reactivity of rice husk ash", Journal of Materials Science (2006) 41:7926-7933.*

(Continued)

*Primary Examiner* — Stanley Silverman
*Assistant Examiner* — Anthony J Zimmer
(74) *Attorney, Agent, or Firm* — Clark & Brody

(57) ABSTRACT

A production method of amorphous silica comprises a step of preparing organic waste containing silicon oxide as a starting material, a step of immersing the organic waste in a carboxylic acid aqueous solution having a hydroxyl group, a step of washing the organic waste in water, and a step of heating the organic waste in the air atmosphere.

2 Claims, 2 Drawing Sheets

---

STARTING MATERIAL (ORGANIC WASTE CONTAINING SILICON OXIDE)

CLEANING PROCESS WITH CARBOXYLIC ACID HAVING HYDROXYL GROUP

WASHING PROCESS IN WATER FOR ORGANIC WASTE CLEANED WITH ACID

HEATING AND BURNING IN THE AIR ATMOSPHERE

FOREIGN PATENT DOCUMENTS

| | | |
|---|---|---|
| JP | 2003-171114 | 6/2003 |
| JP | 2003-522703 | 7/2003 |
| JP | 2003-529518 | 10/2003 |
| JP | 2004-527445 | 9/2004 |
| JP | 2004-529054 | 9/2004 |
| JP | 2006-187674 | 7/2006 |
| WO | 2007/026680 | 8/2007 |

OTHER PUBLICATIONS de Souza et al. "Silica Derived from Burned Rice Hulls", Materials Research, vol. 5, No. 4, 467-474, 2002.*

S. Chandraskhar et al., "Effect of organic acid treatment on the properties of rice husk silica" (2005) *Journal of Materials Science*, vol. 40, pp. 6535-6544.

* cited by examiner

US 7,998,448 B2

AMORPHOUS SILICA AND ITS MANUFACTURING METHOD

TECHNICAL FIELD

The present invention relates to high-purity amorphous silica produced from organic waste (biomass raw material) such as chaff, rice straw, rice bran or wood, and its production method.

BACKGROUND ART

About 20% of amorphous silicon oxide (silica/$SiO_2$) is contained in nonfood farm crops such as chaff or rice straw as well as carbohydrate such as cellulose or hemicellulose. Thus, conventionally, it has been tried that high-purity amorphous silica is extracted and used as a soluble silica fertilizer in order to recycle the nonfood farm crops. In addition, since such amorphous silicon oxide has high pozzolan activity, it forms stable calcium silicate by a hydration reaction with cement and as a result, the cement is densified and its strength is improved.

As a method of extracting silica from chaff, there is known a conventional method in which a blasting treatment, steaming treatment, supercritical water treatment or acid cleaning treatment using concentrated sulfuric acid or hydrochloric acid are performed on the chaff and the chaff after the above treatments is heated and burned. High-purity silica can be produced as combustion ash by the above methods. However, according to any one of the above production methods, the problem is that the production process is complicated and at the same time, productivity is low and an expensive high-grade material is used in a treatment container in view of corrosion resistance and environment resistance. In other words, the above production methods have an economic problem for a method of extracting combustion ash silica from chaff or rice straw in large quantity at low cost.

Some documents disclosing production methods of amorphous silica from chaff will be introduced below.

Japanese Examined Patent Publication No. 7-57684 discloses "production method of high-purity silica from chaff". According to the method disclosed in this document, chaff is treated with a solution of hydrofluoric acid (HF) to extract an existing silicon compound contained in the chaff to produce silica. More specifically, the silicon compound after the treatment with the solution of hydrofluoric acid is extracted as hexafluorosilicic acid ($H_2SiF_6$) and the extract is added with ammonia and decomposed via ammonium hexafluorosilicate (($NH_4)_2SiF_6$) into ammonium fluoride ($NH_4F$) and silica ($SiO_2$), and this is separated by filtration, washed in water and dried to obtain amorphous silicon oxide powder. According to this method, the problem is that economic efficiency is lowered because expensive hydrofluoric acid is used and the material of an equipment to be used is expensive because hydrofluoric acid has strong corrosive aggressiveness.

Japanese Unexamined Patent Publication No. 2006-187674 discloses a "silicic acid-containing powder production method and silicic acid-containing powder production system". According to the method disclosed in this document, chaff or straw is fed into a treatment container and steam is jet into the treatment container while an inner pressure and a temperature is increased to powder the chaff or straw without burning it. Thus, a straight fertilizer can be produced from the chaff or straw directly.

Japanese Unexamined Patent Publication No. 5-194007 discloses "production method of amorphous silica fine powder and concrete blended with amorphous silica fine powder". According to the method disclosed in this document, amorphous silica fine powder is produced by immersing chaff in a solution of hydrochloric acid and burning and grinding it. When the chaff is cleaned with a hydrochloric acid aqueous solution having a concentration of 5%, $SiO_2$ purity is about 96%, which is not satisfactory. In order to implement 98% or more of the $SiO_2$ purity, it is necessary to prepare a hydrochloric acid aqueous solution having a concentration of 10% to 20%. In this case, since chlorine (Cl) remains in silica powder provided after burned at 600 to 700° C., when this silica powder is used as a concrete raw material, the chlorine could corrode reinforcing steel.

Japanese National Publication of PCT Application No. 2004-527445 discloses "production method of high-purity amorphous silica from biogenic material". According to the method disclosed in this document, a long-chain hydrocarbon compound such as lignin or cellulose is reduced to further combustible (volatile) short-chain hydrocarbon compound by immersing a biogenic material such as chaff in a solution having an oxidizing solute (selected from a group comprising peroxide, nitrate salt and permanganate) to reduce an amount of carbonaceous residual material of silica produced by the next process of burning. The burning temperature at that time is preferably 500 to 950° C. Crystallization of silica is accelerated during the high-temperature burning process.

Japanese Unexamined Patent Publication No. 7-196312 discloses "production method of amorphous silica comprising chaff as raw material". According to the method disclosed in this document, chaff is thrown into a fluidized bed and primarily burned in a short time at 640 to 800° C. for 4 to 10 seconds and then thrown into a rotary furnace of an external heating type and secondly burned at 700 to 950° C. for 8 to 15 minutes. According to this method, amorphous silica having a low content of unburned carbon and high pozzolan reactivity can be obtained.

Japanese Unexamined Patent Publication No. 8-48515 discloses "production method of amorphous silica from chaff as raw material". According to the method disclosed in this document, by immersing chaff in water and then burning it, or by supplying or ejecting water or steam before or at the time of burning, high-purity amorphous silica is produced. An impurity adhered to a chaff surface is removed by immersing the chaff in the water or supplying or ejecting the water, and then the chaff is burned at 550 to 600° C.

S. Chandrasekhar et. al. published an article entitled "Effect of organic acid treatment on the properties of rice husk silica) in JOURNAL OF MATERIALS SCIENCE 40 (2005) 6535-6544. According to the method disclosed in this article, two kinds of organic aqueous solutions such as acetic acid and oxalic acid are prepared, the aqueous solutions having a concentration of about 0.5% to 30% are boiled and chaff is thrown into these aqueous solutions, stirred for 90 minutes, taken out of the aqueous solutions, washed in water, dried at 110° C. and burned at 700° C. for 2 hours, by which amorphous silica having purity of 93 to 96.7% is produced.

Japanese Unexamined Patent Publication No. 11-323752 discloses "production method of material with high content of silica, cellulose and lignin". According to the method disclosed in this document, after blasting or steaming treatment of a woody material such as chaff, rice straw or bagasse (the woody material is immersed into a solution such as hydrochloric acid, sulfuric acid or nitric acid and heated and pressurized), the woody material is burned at 550 to 900° C. (more preferably, at 600 to 700° C.), whereby amorphous silicon oxide having $SiO_2$ content of 95% or more is produced. In other words, to produce high-purity silicon oxide having purity of 96% or more, it is necessary to thermally dissolve and remove the impurity by heating and burning at a higher temperature. However, the problem is that such heating at the high temperature causes a crystal structure of the silicon oxide to become crystobalite (crystallized).

Japanese Unexamined Patent Publication No. 8-94056 discloses "incinerating method for organic waste". According to the method disclosed in this document, organic waste such as chaff or straw is dry distilled or heated at 150 to 1000° C., and obtained carbide is cleaned and demineralized with an acid solution, an alkaline solution or a washing solution containing a metal chelate agent, and then the demineralized carbide is incinerated. The obtained demineralized carbide can be used as a cement admixture. The acid includes inorganic acid such as sulfuric acid, chlorine acid and nitric acid and organic acid such as formic acid and acetic acid. The metal chelate agent includes salt having metal complex forming ability such as ethylene diamine tetraacetic acid (EDTA), nitrilo toriacetic acid (NTA), and ethylene diamine tetrapropionic (EDTP). Thus, when the demineralizing process is performed before the incinerating process, a preferable cement admixture can be provided. In addition, since hydrogen chloride is hardly contained in incinerated exhaust fume, dioxine can be prevented from being generated.

SUMMARY OF THE INVENTION

It is an object of the present invention to produce high-purity amorphous silica from organic waste such as farm crops, plant or wood without using inorganic acid such as sulfuric acid, chlorine acid or nitric acid.

A production method of amorphous silica according to the present invention comprises a step of preparing organic waste containing silicon oxide as a starting material, a step of immersing the organic waste in a carboxylic acid aqueous solution having a hydroxyl group, a step of washing the organic waste in water, and a step of heating the organic waste in the air atmosphere.

Preferably, the carboxylic acid is either one selected from a group consisting of citric acid, isocitric acid, dihydroxysuccinic acid, malic acid, and lactic acid. A temperature of the carboxylic acid aqueous solution is preferably 50° C. to 80° C. A concentration of the carboxylic acid aqueous solution is preferably 0.5% to 10%.

A heating temperature in the air atmosphere is preferably 300° C. to 1100° C.

Preferably, the step of heating the organic waste in the air atmosphere comprises a first heating step of heating at 300° C. to 500° C., and a second heating step of heating at 600° C. to 1100° C.

Preferably, the organic waste is either chaff, rice straw, rice bran, straw, wood, thinned wood, construction debris, sawdust, bark, bagasse, corn, sugarcane, sweet potato, soybean, peanut, cassaya, eucalyptus, fern, pineapple, bamboo, rubber, or used paper.

According to one embodiment, the step of preparing the organic waste as the starting material comprises a step of crushing and miniaturizing the organic waste.

Preferably, a weight reduction rate after the organic waste has been immersed in the carboxylic acid aqueous solution and burned is 87% or more.

In order to enhance a cleaning effect, a volume of the water used in the washing process is preferably not less than 30 times as much as that of the organic waste to be processed. According to one embodiment, the washing process in water is performed three times or more and a volume of the water used in each washing process is not less than 10 times as much as that of the organic waste to be processed.

In order to remove a specific component in the organic waste with high efficiency, a step of immersing the organic waste in different kind of acid may be provided in addition to the step of immersing it in the carboxylic acid aqueous solution. As the different kind of acid, oxalic acid may be used. As combination with the different kind of acid cleaning, a method in which the organic waste is cleaned with citric acid and then cleaned with oxalic acid, or reversely a method in which the organic waste is cleaned with oxalic acid and then cleaned with citric acid can be employed. In addition, the organic waste may be immersed in a solution mixed with citric acid and oxalic acid and cleaned with it.

Amorphous silica according to the present invention is obtained by any one of the above methods and characterized in that purity of silicon dioxide is 98% or more.

Preferably, a carbon content is 0.2% by weight or less, and a sulfur content is 0.1% by weight or less as impurities. More preferably, a carbon content is 0.1% by weight or less, and a sulfur content is 0.05% by weight or less as impurities.

The technical meaning and effect of the above-described characteristic matters will be described in detail in the following sections.

DESCRIPTION OF THE PREFERRED EMBODIMENTS (1) Main Characteristics of the Present Invention According to the present invention, organic waste of farm crops and wood such as chaff, rice straw, rice bran, straw, wood, sawdust, and bark is an object to be processed and the organic waste undergoes an acid cleaning process in which the object is immersed and stirred in a specific carboxylic acid aqueous solution and the organic waste is washed in water and then burned at an appropriate temperature, whereby amorphous silica having purity of 98% or more is produced.

Through the acid cleaning process with the carboxylic acid aqueous solution, a metal impurity such as potassium, calcium, or aluminum contained in the organic waste is removed and eliminated from the waste by a chelate reaction. When the metal impurity is removed and eliminated, carbohydrate such as cellulose or hemicellulose is prevented from reacting with the metal impurity and as a result, an amount of residual carbon is reduced, whereby high-purity silica can be provided.

The amorphous silica provided as described above can be used for a concrete admixture, a tire rubber reinforcement, a soluble fertilizer, a cosmetic raw material, a coating material and the like.

(2) One Example of Production Method of High-Purity Amorphous Silica

Figure 1:
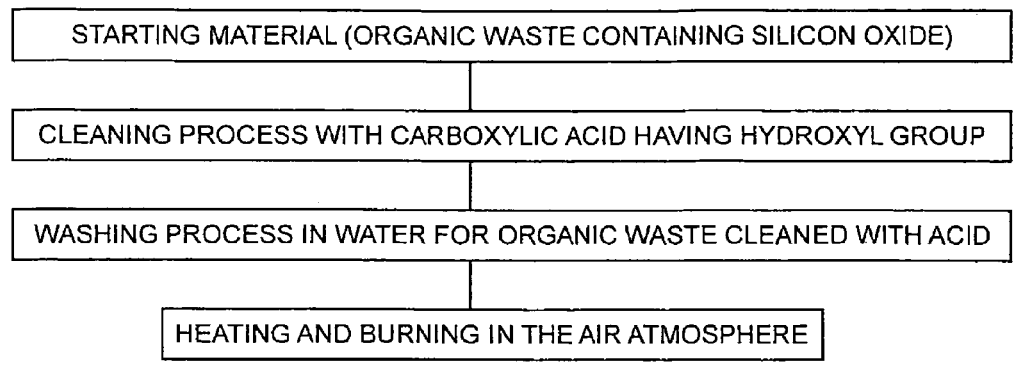
FIG. 1 is a view showing one example of a production method of high-impurity amorphous silica according to the present invention.

FIG. 1 shows one example of a production method of high-purity amorphous silica according to the present invention. The inventors of the present invention have found that high-purity amorphous silica is produced when an input raw material comprising organic waste such as farm crops, wood and plant undergoes the following processes.
(A) The organic waste of the raw material undergoes an acid cleaning process in which it is immersed in a carboxylic acid aqueous solution having a hydroxyl group and stirred.
(B) Then, the organic waste is washed in water.
(C) Through the acid cleaning process and washing processes in water several times, a metal impurity such as potassium, calcium, or aluminum contained in the raw material is removed and eliminated from the raw material by a chelate reaction and a dehydration reaction.
(D) Then, the organic waste is burned at an appropriate temperature under an appropriate atmosphere, whereby high-purity amorphous silica is produced.

In order to provide high-purity amorphous silica, it is necessary to appropriately manage each condition in the acid cleaning process, the washing process in water and burning process.

(3) Carboxylic Acid Cleaning Process on Input Raw Material

The organic waste as the input raw material (starting material) is preferably chaff, rice straw, rice bran, straw, wood, thinned wood, construction debris, sawdust, bark, bagasse, corn, sugarcane, sweet potato, soybean, peanut, cassava, eucalyptus, fern, pineapple, bamboo, rubber, or used paper.

The reason why the carboxylic acid having the hydroxyl group is used will be described hereinafter.
(a) An ion of impurity metal such as potassium, calcium, or aluminum contained in the input raw material is embraced by the chelate reaction of a carboxylic group in the carboxylic acid, and it is removed and eliminated in the next washing process in water.
(b) The impurity metal component is removed and eliminated when the dehydration reaction of the hydroxyl group is accelerated in the burning process of the input raw material.

It is desirable to use citric acid, isocitric acid, dihydroxysuccinic acid, malic acid, or lactic acid as the carboxylic acid having the hydroxyl group in order to provide the above effect with high efficiency. Especially, since the chaff and rice straw contain a lot of silica as compared with other farm crops and wood, and contain a lot of above impurity metal elements, it is likely that the residual carbon is large in quantity due to a eutectic reaction between silica and the metal component. Thus, in order to produce amorphous silica having purity of 98% or more after the burning process, it is necessary to more efficiently cause the chelate reaction and the dehydration reaction. In this respect, further preferable carboxylic acid has the hydroxyl group and three or more carboxylic groups. More specifically, citric acid or isocitric acid is preferably used.

Figure 2:
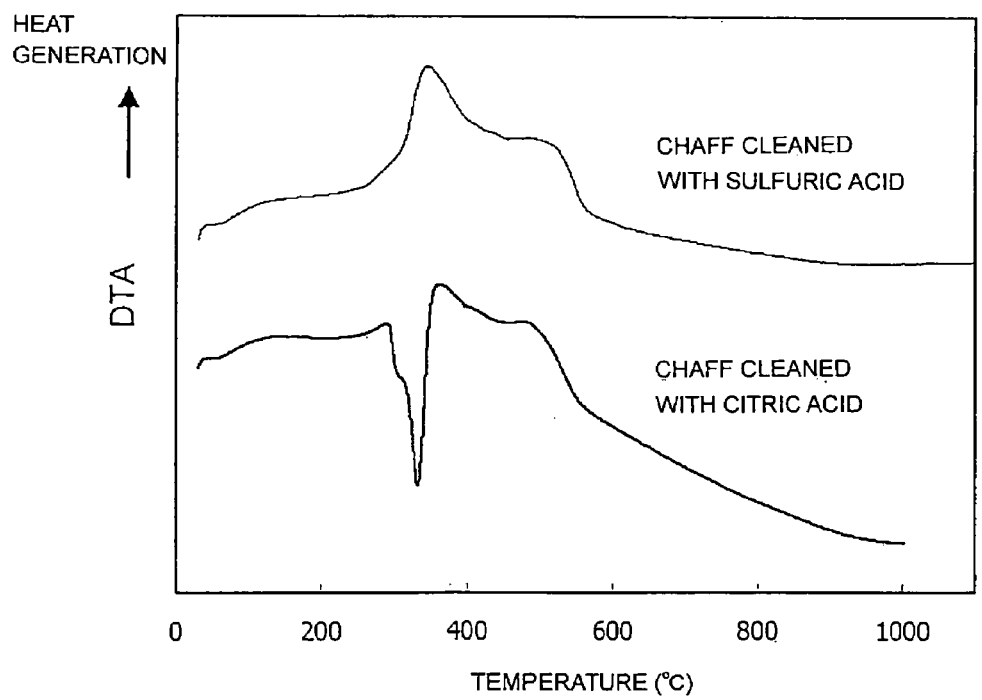
FIG. 2 is a view showing a differential thermal analysis result of a chaff sample after acid treatment.

A sulfuric acid aqueous solution having a concentration of 5% and a citric acid aqueous solution having a concentration of 5% were prepared and the chaff was cleaned with either of them and washed in water. FIG. 2 shows a result of differential thermal analysis of the processed chaff samples.

In the case where the sulfuric acid aqueous solution is used, an exothermic peak due to burning of carbohydrate is observed at temperature in the range of 300° C. to 500° C. Meanwhile, in the case where the citric acid aqueous solution is used, a distinguished endothermic peak is observed at about 300° C. to 380° C. due to the dehydration reaction by the hydroxyl group of the citric acid. Thus, when the organic waste such as the farm crops is cleaned with the carboxylic acid aqueous solution having the hydroxyl group, the dehydration reaction is caused by the hydroxyl group and the impurity metal component such as potassium, calcium, or aluminum is removed from the organic waste and as a result, silica purity after the burning process is improved.

In addition, as compared with the acid cleaning with strong mineral acid such as hydrochloric acid or sulfuric acid, according to the production method of the present invention, a chlorine content in combustion ash is less than a measurement lower limit value (<0.01%) and a sulfur content in the ash is not more than 0.1%. As for a sulfur content, it can be reduced to 0.01% to 0.05% or less by optimizing the washing process in water of the next process, which is considerably reduced as compared with the combustion ash cleaned with the sulfuric acid (0.2% to 0.6%).

A concentration of the carboxylic acid aqueous solution is preferably 0.5% to 10%. When the concentration is less than 0.5%, a sufficient chelate effect is not provided, but even when it is more than 10%, the chelate effect is not improved but an economic problem that the number of the next washing processes in water is increased is caused. Thus, chaff combustion ash provided after the chaff has been cleaned with the above carboxylic acid aqueous solution having the preferable concentration and then washed in water and burned contains less than 0.2% of carbon. In addition, the carbon content can be reduced to 0.1% or less by performing the plurality of washing processes in water. Furthermore preferably, when the temperature of the carboxylic acid aqueous solution is controlled within a range of 50° C. to 80° C., the content of the impurity such as potassium oxide, calcium oxide or phosphorus oxide can be also reduced and the carbon content is considerably reduced to a range of 0.01% to 0.03% or less. Thus, when the impurity metal element is reduced by the chelate reaction and the dehydration reaction, the impurity content in the combustion ash can be reduced.

The temperature of the carboxylic acid aqueous solution is preferably not less than room temperature and more preferably in a range of 50° C. to 80° C. When the temperature of the carboxylic acid aqueous solution is raised to the range of 50 to 80° C., the contents of potassium (K), calcium (Ca) and phosphorus (P) can be reduced. However, even when the temperature of the carboxylic acid aqueous solution is raised more than the above range, the effect is not improved but the problem is that moisture evaporates and the concentration of the carboxylic acid aqueous solution varies when the solution becomes a boiling state around at 100° C.

In addition, the similar method to the present invention is disclosed in the above-described Japanese Unexamined Patent Publication No. 8-94056. According to the method disclosed in the above document, the organic waste such as chaff or straw is dry distilled or heated at 150° C. to 1000° C. and then cleaned and demineralized with the acid solution, alkaline solution or washing solution containing the metal chelate agent and the demineralized carbide is incinerated. That is, the organic waste is heat treated before cleaned with the aqueous solution containing the metal chelate agent and this procedure is opposite to that in the method proposed by the present invention. In addition, effectiveness of the carboxylic acid containing the hydroxyl group that is the characteristics of the present invention is not described or defined in the above document. According to the production method disclosed in the Japanese Unexamined Patent Publication No. 8-94056, since the organic waste containing the impurity metal element is heated, the reaction between the metal element and silica is caused and the residual carbon is large in quantity and as a result, silica purity is low.

According to the method disclosed by S. Chandrasekhar et. al. in Effect of organic acid treatment on the properties of rice husk silica, Journal of Materials Science 40 (2005), 6535-6544, the chaff is thrown into two kinds of boiled organic acid aqueous solutions of acetic acid and oxalic acid having a concentration of about 0.5% to 30%, stirred for 90 minutes, taken out of them, and washed in water, dried at 110° C. and burned for 2 hours at 700° C., whereby amorphous silica is produced from the chaff. Both acetic acid and oxalic acid used here are carboxylic acid having no hydroxyl group unlike the carboxylic acid having the hydroxyl group that is the characteristics in the present invention. In addition, there is no description and no definition about the removal of the impurity metal element such as potassium or calcium by the chelate reaction and the dehydration reaction, and about the effect of the hydroxyl group used to produce high-purity silica. According to the production method disclosed in the above article, an impurity metal element is not completely removed from the chaff and remains in it after the organic acid cleaning process. Therefore, the contents of calcium oxide (CaO) and potassium oxide ($K_2O$) in the chaff ash obtained through burning process are 0.4% to 1.5% and 0.03% to 0.3%, respectively, which are higher than that in the production method according to the present invention. In addition, similarly, the reduced amounts of magnesium oxide (MgO), sodium oxide ($Na_2O$) and iron oxide ($Fe_2O_3$) are small in the combustion ash. As a result, the silica purity in the chaff ash is 93% to 96.7% that is lower than the silica purity (98% or more) obtained by the production method in the present invention.

In addition, the inventor of the present invention have confirmed that when the farm crop raw material is previously ground and miniaturized, the area of the raw material being in contact with the carboxylic acid aqueous solution is increased and as a result, the region in which the chelate reaction is generated is increased and the reducing effect of the impurity metal element is further improved and the residual carbon amount in the combustion ash is reduced, whereby high-purity silica can be provided. For example, while the silica purity in the combustion ash obtained through the citric acid cleaning, washing in water and burning processes using raw material chaff that is not previously crushed is 99.1%, the silica purity in the baked ash obtained through the same processes such as the citric acid cleaning, washing in water and burning processes using chaff that is crushed by a food mixer under a dry condition to have an average grain diameter of about ⅓ of the original raw material is 99.6%. Thus, when the organic waste to be prepared as the starting material is crushed and miniaturized, the purity of silica is high.

Since chaff and rice straw are a biomass fuel, the amount of the carbohydrate such as cellulose or hemicellulose is not considerably reduced even through the above-described acid cleaning process with the carboxylic acid aqueous solution, which is preferable.

Figure 3:
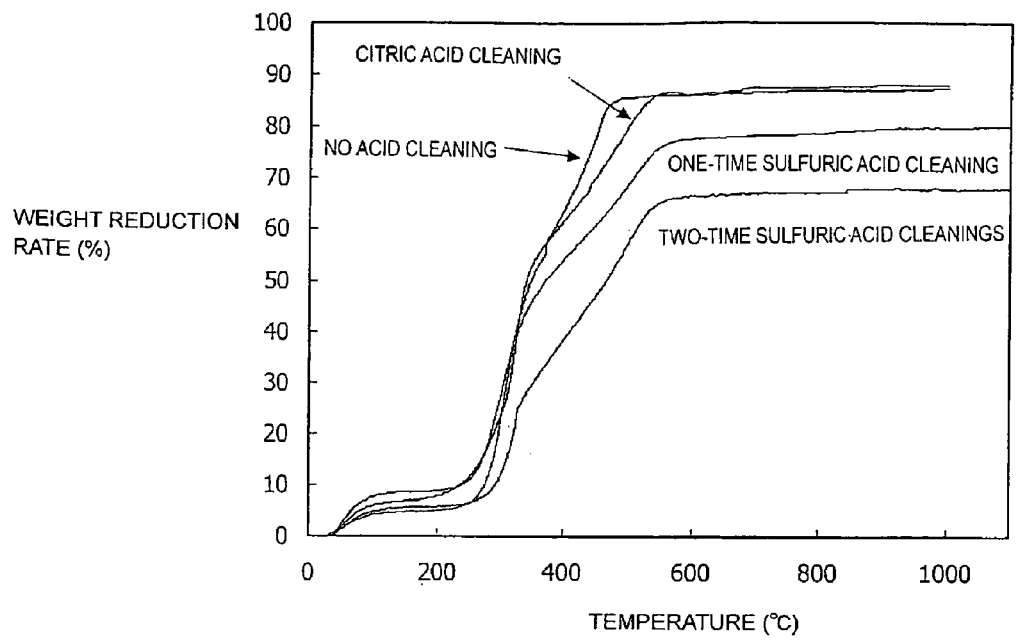
FIG. 3 is a view showing a weight change rate of various kinds of samples by a heating process at room temperature to 1000° C.

FIG. 3 shows a weight reduction rate of various kinds of samples through the heating process ranging from room temperature to 1000° C. As the samples, the sample cleaned with sulfuric acid one time, the sample cleaned with sulfuric acid two times, the sample cleaned with citric acid, and the sample not cleaned with acid were prepared.

As shown in FIG. 3, the raw material chaff not cleaned with acid is reduced by about 87% in weight. This is because the carbohydrate such as cellulose or hemicellulose is thermally decomposed in the heating process at up to 1000° C. Meanwhile, when the chaff is cleaned with the sulfuric acid aqueous solution having a concentration of 5% (one-time cleaning and two-time cleaning are shown in the drawing), they are reduced by 80% and 68% in weight, respectively. This result means that the carbohydrate amount in the sample cleaned with sulfuric acid is smaller than that of the raw material chaff not cleaned with acid, by 10 to 20%, that is, the carbohydrate is dissolved by sulfuric acid when the chaff is washed in the sulfuric acid aqueous solution. Therefore, when the chaff cleaned with sulfuric acid is used as the biomass fuel to generate electricity, the problem is that the calorific value is reduced and energy efficiency is lowered.

Meanwhile, a weight change is about 88% when the citric acid having the concentration of 5% is used, which is the same as the raw material chaff. That is, carbohydrate is not dissolved unlike in the case of the sulfuric acid cleaning, so that high energy efficiency can be implemented even in the case where it is used as the biomass fuel. Thus, when the chaff or rice straw cleaned with organic acid according to the present invention is used as the fuel for the biomass energy, the thermal and electrical energy can be provided with high efficiency and at the same time, since the ash of the chaff or rice straw generated through the burning process is the amorphous silica having high purity of 98% or more, it can be recycled as resources. In order to use it as energy effectively, it is desirable that the weight reduction after the organic waste has been immersed in the carboxylic acid aqueous solution and burned is 87% or more.

(4) Washing Process in Water on Input Raw Material Cleaned with Carboxylic Acid

In order to remove and eliminate the impurity metal element ion embraced by the chelate effect of carboxylic acid, from the raw material such as farm crops, it is necessary to wash it in water subsequently. Even when the washing process in water is performed at room temperature, although a removing effect can be provided, the removing effect can be improved when the washing process in water is performed at 50° C. or more.

In addition, as for the washing process condition in water, the sufficient removing effect can be provided by using water having a volume of more than 30 times, more preferably 50 times as much as that of the raw material. For example, in a case where 50 cc of chaff is used, the chaff cleaned with carboxylic acid under a certain condition is thrown into a bath having 500 cc of distilled water and stirred for 15 minutes and then the distilled water is disposed. Then, 500 cc of distilled water is poured in the bath in which the chaff remains. Repeating the above process three times means that the chaff is washed in the distilled water having the volume of 30 times as much as that of the raw material chaff.

Although a removing effect can be provided in a case where the washing process in water may be performed one time with water having a volume of 30 times as much as that of the raw material, a more sufficient removing effect can be provided in the case where the washing process in water is performed three times or more while each washing process uses the water having a volume of more than 10 times as much as that of the raw material.

Although a component that harms environment such as sulfur and chlorine is contained in sulfuric acid, hydrochloric acid and nitric acid, since the acid cleaning process in the present invention uses carboxylic acid, a component that harms environment is not contained in discharged water used in washing the farm crops after the acid treatment. Therefore, the discharging process can be easy.

(5) Burning Process of Raw Material After Carboxylic Acid Process and Washing Process in Water In order to enhance the silica purity, it is necessary to previously reduce the content of the impurity metal element to reduce the residual carbon amount as described above. Furthermore, it is important to reduce the residual carbon amount by surely generating the dehydration reaction of the hydroxyl group and completely burning carbohydrate with sufficient air (oxygen) supply in the burning process. The inventors of the present invention have found that it is desirable that when the raw material after the cleaning process with carboxylic acid and washing process in water is burned, the heating temperature is set at 300° C. to 1100° C. When it is less than 300° C., since carbohydrate is not completely burned, the residual carbon component is large in quantity and the silica purity is low. Meanwhile, when it is more than 1100° C., the problem is that the crystal structure of silica becomes crystobalite (crystallized).

Figure 4:
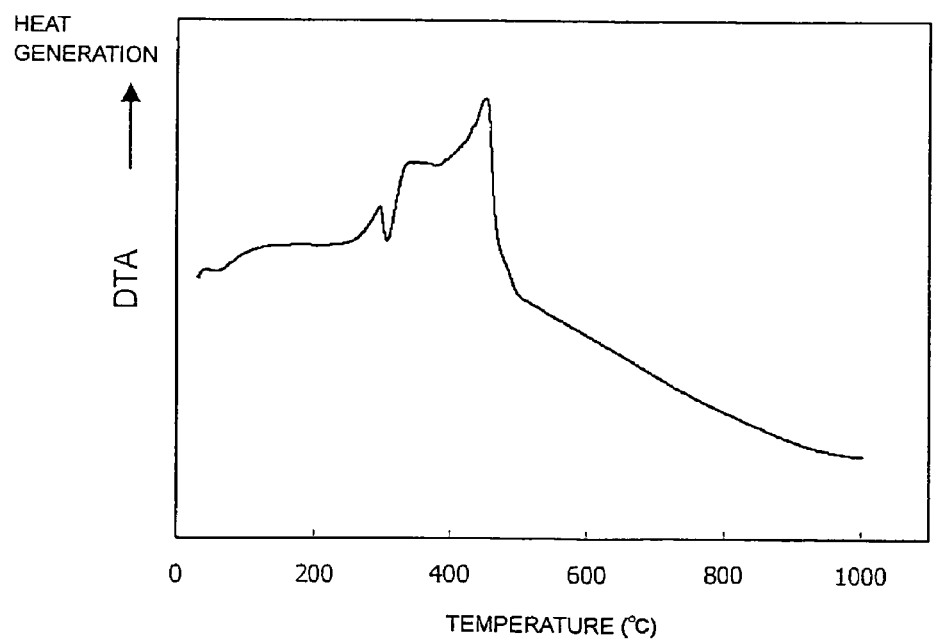
FIG. 4 is a view showing a differential thermal analysis result of raw material chaff not processed by carboxylic acid cleaning treatment.

FIG. 4 shows a differential thermal analysis result of a raw material chaff not cleaned with carboxylic acid. As shown in FIG. 4, exothermic peaks are observed at 300° C. to 400° C. and 400° C. to 480° C. in two stages. These correspond to heat quantities generated when carbohydrates (two kinds of carbohydrates of pentose component and hexose component) contained in the chaff are burned.

The inventors of the present invention have considered that the residual carbon amount can be reduced and the silica purity can be improved by completely decomposing the carbohydrate in the above two exothermic processes and have found the following preferable method. That is, the process for heating the organic waste such as the chaff in the air atmosphere comprises a first heating step to burn the raw material at 300° C. to 500° C. where the two exothermic peaks are generated, with sufficient oxygen supply, and a second heating step to heat it in the air atmosphere at 600° C. to 1100° C. Such two-stage heating enables the carbohydrate to be completely burned.

In order to confirm the above effect, raw material rice straw not cleaned with acid was prepared and the raw material rice straw was thrown into a furnace set at 400° C. with the air supplied forcibly and heated for 30 minutes. Then, it was heated and held at 800° C. in the air atmosphere for 15 minutes to obtain combustion ash. The silica purity in this combustion ash was as high as 98.4% and the carbon content in it was as low as 0.08%. In addition, rice straw was cleaned with the citric acid aqueous solution having the concentration of 5%, washed in water, similarly heated and held at 400° C. for 30 minutes, and then heated and held at 800° C. for 15 minutes. The silica purity in the obtained combustion ash was 99.5% and the carbon content thereof was 0.04%. Thus, when the acid process and the washing process in water are performed according to the present invention, the impurity is reduced and the high-purity silica can be provided.

In addition, in Japanese Unexamined Patent Publication No. 7-196312 also, the method similar to that in the present invention is proposed. This document discloses the production method of amorphous silica having the low content of unburned carbon and high pozzolan reactivity by burning chaff in a fluidized bed at 640° C. to 800° C. for 4 to 10 seconds as a first burning step and burning it in a rotary furnace of an external heating type at 700° C. to 950° C. for 8 to 15 minutes as a second burning step. However, the heating temperature range of 640° C. to 800° C. at the first burning step is largely different from the temperature range of 300° C. to 500° C. defined in the present invention. As shown in FIG. 4, when the chaff is burned at above 600° C., the exothermic phenomenon is not generated and carbohydrate has already burned out. In other words, the oxygen supply at a temperature above 600° C. is not effective for the thermal decomposition of carbohydrate and as a result, the residual carbon amount is not reduced and it is difficult to produce highly-purity silica.

(6) Amorphous Silica Provided by Production Method According to the Present Invention According to the amorphous silica produced from the organic waste such as the farm crops under the production condition of the present invention described above, the purity of silicon dioxide ($SiO_2$) is 98% or more. In addition, more preferably, the carbon content in the amorphous silica is not more than 0.2% by weight. When the carbon content exceeds 0.2% by weight, in a case where it is used for a crucible material that is one of formed and fabricated materials using high-purity amorphous silica powder, the heat resistance of the produced crucible is low and its life is short. In addition, when the amorphous silicon oxide powder is used as a cosmetic raw material such as a foundation, there is fear that it affects the skin. Furthermore, in a case where the amorphous silicon oxide is used as a high-strength concrete reinforcement, when a carbon content exceeds 0.2% by weight, it absorbs a chemical admixture such as a water reducing agent or an air entraining agent, and when a silicon dioxide content is less than 98% by weight, sufficient strength improvement cannot be provided.

Thus, it is preferable that the carbon content in amorphous silica is not more than 0.2% by weight and a sulfur content is not more than 0.1% by weight and it is more preferable that the carbon content is not more than 0.1% by weight and the sulfur content is not more than 0.05% by weight.

In addition, even when amorphous silica having purity of less than 98% is used, concrete strength is improved due to pozzolanic activity as compared with crystalline silica. When amorphous silica having purity of 98% is used according to the present invention, higher strength is implemented in the concrete material. Furthermore, the high-purity amorphous silica powder according to the present invention can be used as a coating material.

(7) Cleaning Process Using Different Kind of Acid

In order to remove a specific component in the organic waste effectively, in addition to the step of immersing the organic waste in the carboxylic acid aqueous solution, a step of immersing it in different kind of acid may be provided. As the different kind of acid, oxalic acid can be used, for example. When a step of immersing the organic waste in an oxalic acid aqueous solution in addition to the step of immersing it in the carboxylic acid aqueous solution to be cleaned, the phosphorus component and the potassium component in the organic waste can be more effectively removed. In the case where the different kind of acid is used, a method of cleaning the organic waste with oxalic acid after cleaning it with citric acid, or a method of cleaning the organic waste with citric acid after cleaning it with oxalic acid can be employed. In addition, the organic waste may be immersed in a mixed solution of oxalic acid and citric acid to be cleaned.

WORKING EXAMPLE 1

As a raw material, 10 g of chaff was thrown into each aqueous solution of citric acid, dihydroxysuccinic acid, malic acid, lactic acid, phosphoric acid, ethylene diamine tetra-acetic acid (EDTA), acetic acid, and oxalic acid and immersed therein for 15 minutes and then washed in water (room temperature water having a volume of 30 times as much as the raw material) and burned in an electric furnace under the air atmosphere at 800° C. for 30 minutes.

Quantitative analysis of the elements contained in the obtained chaff ash was performed by an X-ray fluorescence spectroscopy (XRF) equipment. The result is shown in table 1.

TABLE 1

| | Sample No. | | | | | | | | |
|---|---|---|---|---|---|---|---|---|---|
| | 1 raw material chaff not cleaned with acid | 2 chaff cleaned with acid citric acid | 3 chaff cleaned with acid dihydroxy succinic acid | 4 chaff cleaned with acid malic acid | 5 chaff cleaned with acid lactic acid | 6 chaff cleaned with acid phosphoric acid | 7 chaff cleaned with acid EDTA | 8 chaff cleaned with acid acetic acid | 9 chaff cleaned with acid oxalic acid |
| temperature of solution | — | room temperature | room temperature | room temperature | room temperature | room temperature | room temperature | room temperature | room temperature |
| concentration of acid | — | 5% | 5% | 5% | 5% | 5% | 1% | 5% | 5% |
| washing process in water | — | 30 times | 30 times | 30 times | 30 times | 30 times | 30 times | 30 times | 30 times |
| $SiO_2$ | 94.58 | 99.12 | 98.90 | 99.11 | 99.10 | 97.10 | 97.10 | 95.70 | 96.40 |
| $Al_2O_3$ | 0.03 | 0.01 | 0.01 | 0.02 | 0.03 | 0.03 | 0.02 | 0.02 | 0.03 |
| MgO | 0.31 | 0.06 | 0.10 | 0.04 | 0.03 | 0.06 | 0.19 | 0.21 | 0.19 |
| $Na_2O$ | 0.11 | 0.08 | 0.13 | 0.10 | 0.13 | 0.12 | 0.12 | 0.09 | 0.09 |
| $P_2O_5$ | 0.41 | 0.34 | 0.37 | 0.31 | 0.29 | 2.40 | 0.42 | 0.39 | 0.28 |
| S | 0.11 | 0.03 | 0.02 | 0.03 | 0.02 | 0.00 | 0.03 | 0.02 | 0.03 |
| $K_2O$ | 3.69 | 0.13 | 0.15 | 0.11 | 0.14 | 0.07 | 0.84 | 1.94 | 0.97 |
| CaO | 0.56 | 0.16 | 0.22 | 0.20 | 0.18 | 0.14 | 0.53 | 0.49 | 0.44 |
| MnO | 0.08 | 0.02 | 0.02 | 0.01 | 0.01 | 0.01 | 0.03 | 0.05 | 0.02 |
| $Fe_2O_3$ | 0.04 | 0.03 | 0.03 | 0.02 | 0.02 | 0.03 | 0.07 | 0.03 | 0.03 |
| BaO | 0.04 | 0.00 | 0.03 | 0.03 | 0.03 | 0.04 | 0.02 | 0.04 | 0.02 |
| C | 0.60 | 0.03 | 0.04 | 0.08 | 0.07 | 0.13 | 0.24 | 0.32 | 0.28 |

According to samples No. 2 to 5 as the examples of the present invention, potassium oxide and calcium oxide are reduced due to the chelate reaction by the carboxyl group and dehydration reaction by the hydroxyl group, and as a result, the residual carbon amount shows a low value of less than 0.1% and the silica purity is intended 98% or more.

Meanwhile, samples No. 1 and 6 to 9 as comparative examples are as follows. According to non-processed chaff (No. 1), a metal component is not removed and as a result, a residual carbon amount is as large as 0.6% and silica purity is lower than 95%. According to the sample No. 6 cleaned with phosphoric acid, a phosphorus oxide content is high and as a result, silica purity is low. According to the samples No. 7 to 9, although they are cleaned with carboxylic acid, since the hydroxyl group is not contained, the impurity metal elements such as potassium and calcium are not sufficiently removed and as a result, the combustion ash has a large amount of residual carbon and the silica purity is as low as 95 to 97%.

WORKING EXAMPLE 2

Similar to the working example 1, chaff was prepared as an input raw material, and citric acid and sulfuric acid were used as an acid cleaning aqueous solution. Then, an acid cleaning process was performed under concentration conditions shown in table 2 and a washing process in water was performed under an appropriate condition according to the present invention and then a burning process was performed in an electric furnace under the air atmosphere at 800° C. for 30 minutes. Quantitative analysis of the obtained chaff ash was performed by the XRF equipment. The result is shown in table 2.

TABLE 2

| | Sample No. | | | | | | | | |
|---|---|---|---|---|---|---|---|---|---|
| | 10 raw material chaff not cleaned with acid | 11 chaff cleaned with acid citric acid | 12 chaff cleaned with acid citric acid | 13 chaff cleaned with acid citric acid | 14 chaff cleaned with acid citric acid | 15 chaff cleaned with acid sulfuric acid | 16 chaff cleaned with acid sulfuric acid | 17 chaff cleaned with acid sulfuric acid | 18 chaff cleaned with acid sulfuric acid |
| temperature of solution | — | room temperature | room temperature | room temperature | room temperature | room temperature | room temperature | room temperature | room temperature |
| concentration of acid | — | 1% | 3% | 5% | 30% | 5% | 10% | 20% | 30% |
| washing process in water | — | 30 times | 30 times | 30 times | 30 times | 30 times | 30 times | 30 times | 30 times |
| $SiO_2$ | 94.58 | 99.08 | 99.00 | 99.12 | 98.92 | 99.29 | 99.30 | 99.46 | 99.00 |
| $Al_2O_3$ | 0.00 | 0.03 | 0.00 | 0.03 | 0.00 | 0.01 | 0.01 | 0.00 | 0.01 |
| MgO | 0.31 | 0.06 | 0.07 | 0.06 | 0.09 | 0.02 | 0.01 | 0.02 | 0.01 |
| $Na_2O$ | 0.11 | 0.00 | 0.05 | 0.00 | 0.07 | 0.02 | 0.01 | 0.00 | 0.03 |

TABLE 2-continued

| | Sample No. | | | | | | | | |
|---|---|---|---|---|---|---|---|---|---|
| | 10 raw material chaff not cleaned with acid | 11 chaff cleaned with acid citric acid | 12 chaff cleaned with acid citric acid | 13 chaff cleaned with acid citric acid | 14 chaff cleaned with acid citric acid | 15 chaff cleaned with acid sulfuric acid | 16 chaff cleaned with acid sulfuric acid | 17 chaff cleaned with acid sulfuric acid | 18 chaff cleaned with acid sulfuric acid |
| $P_2O_5$ | 0.41 | 0.31 | 0.35 | 0.34 | 0.33 | 0.23 | 0.17 | 0.10 | 0.05 |
| S | 0.11 | 0.05 | 0.06 | 0.05 | 0.03 | 0.20 | 0.26 | 0.35 | 0.63 |
| $K_2O$ | 3.69 | 0.17 | 0.16 | 0.13 | 0.18 | 0.05 | 0.03 | 0.02 | 0.03 |
| CaO | 0.56 | 0.17 | 0.18 | 0.18 | 0.22 | 0.13 | 0.09 | 0.04 | 0.18 |
| MnO | 0.08 | 0.02 | 0.01 | 0.02 | 0.02 | 0.01 | 0.00 | 0.00 | 0.02 |
| $Fe_2O_3$ | 0.04 | 0.04 | 0.03 | 0.03 | 0.03 | 0.02 | 0.02 | 0.01 | 0.03 |
| BaO | 0.04 | 0.03 | 0.05 | 0.00 | 0.04 | 0.01 | 0.00 | 0.00 | 0.01 |
| C | 0.60 | 0.03 | 0.04 | 0.03 | 0.02 | 0.02 | 0.01 | 0.02 | 0.04 |

As shown in samples No. 11 to 13, as the concentration of the citric acid aqueous solution is increased, the degree of purity of the silica component is increased. However, in the case of the concentration of 30% (sample No. 14), although the silica purity is as high as 98.9%, since metal element ion embraced by the chelate effect is released in the chaff again, a potassium oxide or calcium oxide content is high to cause the purity to be lowered.

Meanwhile, according to samples No. 15 to 18 as the comparative examples, although an impurity metal element is removed by a sulfuric acid aqueous solution and a residual carbon amount is reduced and silica purity is as high as 99% or more, the problem is that a sulfur content in combustion ash is high.

WORKING EXAMPLE 3

Rice straw and chaff were prepared as an input raw material and the effect of the temperature of a citric acid aqueous solution was examined. A concentration was all 5%, a temperature of the citric acid aqueous solution were set at room temperature, 50° C., and 80° C. Each raw material of farm crops was immersed in the aqueous solution for 15 minutes and washed in water (room temperature water having a volume of 30 times as much as the raw material) and then burned in the electric furnace under the air atmosphere at 800° C. for 30 minutes. Quantitative analysis of the obtained combustion ash was performed by the XRF equipment. The result of the rice straw is shown in table 3, and the result of the chaff is shown in table 4. In both cases, silica purity is high when the acid cleaning process is performed at the solution temperature of 50 to 80° C.

TABLE 3

| | Sample No. | | | |
|---|---|---|---|---|
| | 19 raw material rice straw not cleaned with acid | 20 rice straw cleaned with acid citric acid | 21 rice straw cleaned with acid citric acid | 22 rice straw cleaned with acid citric acid |
| temperature of solution | — | room temperature | 50° C. | 80° C. |
| concentration of acid | — | 5% | 5% | 5% |
| washing process in water | — | 30 times | 30 times | 30 times |
| $SiO_2$ | 93.60 | 99.07 | 99.17 | 99.28 |
| $Al_2O_3$ | 0.04 | 0.03 | 0.03 | 0.01 |
| MgO | 0.36 | 0.05 | 0.04 | 0.06 |
| $Na_2O$ | 0.14 | 0.04 | 0.04 | 0.09 |
| $P_2O_5$ | 0.56 | 0.31 | 0.23 | 0.27 |
| S | 0.08 | 0.02 | 0.03 | 0.01 |
| $K_2O$ | 3.80 | 0.11 | 0.09 | 0.06 |
| CaO | 0.72 | 0.17 | 0.15 | 0.11 |
| MnO | 0.11 | 0.02 | 0.02 | 0.01 |
| $Fe_2O_3$ | 0.04 | 0.03 | 0.02 | 0.03 |
| BaO | 0.03 | 0.01 | 0.03 | 0.02 |
| C | 0.72 | 0.04 | 0.07 | 0.08 |

TABLE 4

| | Sample No. | | | |
|---|---|---|---|---|
| | 23 raw material chaff not cleaned with acid | 24 chaff cleaned with acid citric acid | 25 chaff cleaned with acid citric acid | 26 chaff cleaned with acid citric acid |
| temperature of solution | — | room temperature | 50° C. | 80° C. |
| concentration of acid | — | 5% | 5% | 5% |
| washing process in water | — | 30 times | 30 times | 30 times |
| $SiO_2$ | 94.58 | 99.12 | 99.14 | 99.30 |
| $Al_2O_3$ | 0.00 | 0.03 | 0.03 | 0.00 |
| MgO | 0.31 | 0.06 | 0.08 | 0.06 |
| $Na_2O$ | 0.11 | 0.00 | 0.06 | 0.09 |
| $P_2O_5$ | 0.41 | 0.34 | 0.29 | 0.27 |
| S | 0.11 | 0.05 | 0.03 | 0.01 |
| $K_2O$ | 3.69 | 0.13 | 0.12 | 0.04 |
| CaO | 0.56 | 0.18 | 0.16 | 0.13 |
| MnO | 0.08 | 0.02 | 0.01 | 0.01 |
| $Fe_2O_3$ | 0.04 | 0.03 | 0.03 | 0.02 |
| BaO | 0.04 | 0.00 | 0.03 | 0.03 |
| C | 0.60 | 0.03 | 0.10 | 0.09 |

WORKING EXAMPLE 4

Similar to the working example 1, chaff was prepared as an input raw material and dihydroxysuccinic acid was used as an acid cleaning aqueous solution (having a concentration of 5%) to perform the acid cleaning process at room temperature. Then, the washing process in water was performed under the condition that the volume ratio of the water to the chaff was 5 times, 30 times and 50 times.

Then, the chaff after the washing process in water was burned in the electric furnace under the air atmosphere at 800° C. for 30 minutes. Quantitative analysis of obtained chaff ash was performed by the XRF equipment. The result is shown in table 5. As the volume of the water is increased to 30 times and 50 times from the 5 times, that is, as the number of the washing processes in water is increased, potassium oxide and calcium oxide are reduced and a discharging effect of the impurity metal element to the outside by the chelate reaction is accelerated and as a result, silica purity is further improved.

TABLE 5

| | Sample No. | | | |
|---|---|---|---|---|
| | 27 raw material chaff not cleaned with acid | 28 chaff cleaned with acid dihydroxysuccinic acid | 29 chaff cleaned with acid dihydroxysuccinic acid | 30 chaff cleaned with acid dihydroxysuccinic acid |
| temperature of solution | — | room temperature | room temperature | room temperature |
| concentration of acid | — | 5% | 5% | 5% |
| washing process in water | — | 30 times | 50 times | 5 times |
| $SiO_2$ | 94.58 | 98.90 | 99.42 | 98.20 |
| $Al_2O_3$ | 0.00 | 0.01 | 0.03 | 0.02 |
| MgO | 0.31 | 0.10 | 0.06 | 0.22 |
| $Na_2O$ | 0.11 | 0.13 | 0.06 | 0.14 |
| $P_2O_5$ | 0.41 | 0.37 | 0.15 | 0.46 |
| S | 0.11 | 0.02 | 0.03 | 0.03 |
| $K_2O$ | 3.69 | 0.15 | 0.04 | 0.29 |
| CaO | 0.56 | 0.22 | 0.08 | 0.37 |
| MnO | 0.08 | 0.02 | 0.01 | 0.05 |
| $Fe_2O_3$ | 0.04 | 0.03 | 0.02 | 0.04 |
| BaO | 0.04 | 0.03 | 0.02 | 0.03 |
| C | 0.60 | 0.04 | 0.04 | 0.14 |

WORKING EXAMPLE 5

In this example, 10 g of chaff was immersed in 500 ml of an acid aqueous solutions (having a concentration of 5%) shown in table 6 and stirred in the solution at 60° C. for 30 minutes and washed in water (having a volume of 30 times as much as the chaff) and filtered and water in the chaff was completely removed by a drying process at 105° C. for 60 minutes. The change of chaff weight before and after the above series of processes is shown in table 6.

TABLE 6

| | Sample No. | | | | | |
|---|---|---|---|---|---|---|
| | 31 citric acid | 32 sulfuric acid | 33 hydrochloric acid | 34 nitric acid | 35 phosphoric acid | 36 oxalic acid |
| Before acid cleaning process (g) | 10.00 | 10.00 | 10.00 | 10.00 | 10.00 | 10.00 |
| After acid cleaning process (g) | 9.25 | 8.87 | 8.65 | 9.20 | 8.53 | 9.24 |
| change of weight (g) | 0.75 | 1.13 | 1.35 | 0.80 | 1.47 | 0.76 |

Since sulfuric acid (sample No. 32), hydrochloric acid (sample No. 33) and phosphoric acid (sample No. 35) dissolve and decompose carbohydrate in the chaff, the amount of weight reduction is large as compared with a case where another acid is used. In order words, when the chaff is processed with citric acid (sample No. 31) according to the present invention, carbohydrate such as cellulose or hemicellulose sufficiently remains in the chaff after the acid cleaning process and the washing process in water without being dissolved or decomposed, so that it can be effectively used as the biomass fuel.

WORKING EXAMPLE 6

Similar to the working example 5, 10 g of chaff was immersed in 500 ml of acid aqueous solutions (having a concentration of 5%) shown in table 7 and stirred in the solution at 60° C. for 30 minutes and washed in water (having a volume of 30 times as much as the chaff) and filtered and water in the chaff was completely removed by a drying process at 105° C. for 60 minutes. The contents of calcium (Ca) and potassium (K) before and after the acid process were measured by an inductively coupled plasma (ICP) emission spectrometry equipment. Thus, the removing effect of the impurity metal element was evaluated from the weight change amount before and after the acid cleaning. The analyzed result of a Ca content and a K content in the acid aqueous solution are shown in table 7 and table 8, respectively.

TABLE 7

| Change of Ca content | | | | | | | | | | | |
|---|---|---|---|---|---|---|---|---|---|---|---|
| | Sample No. | | | | | | | | | | |
| | 37 citric acid | 38 citric acid | 39 citric acid | 40 dihydroxy succinic acid | 41 malic acid | 42 oxalic acid | 43 oxalic acid | 44 sulfuric acid | 45 hydrochloric acid | 46 nitric acid | 47 phosphoric acid |
| temperature of solution | room temperature | room temperature | room temperature | room temperature | room temperature | room temperature | room temperature | room temperature | room temperature | room temperature | room temperature |
| concentration of acid | 1% | 3% | 5% | 5% | 5% | 3% | 5% | 5% | 5% | 5% | 5% |
| washing process in water | 30 times | 30 times | 30 times | 30 times | 30 times | 30 times | 30 times | 30 times | 30 times | 30 times | 30 times |
| Before acid cleaning process (ppm) | 15.2 | 14.2 | 12.8 | 13.2 | 13.1 | 13.4 | 13.1 | 13.1 | 12.1 | 13.0 | 12.6 |
| After acid cleaning process (ppm) | 22.4 | 22.6 | 22.6 | 21.7 | 22.2 | 18.9 | 19.3 | 21.3 | 27.8 | 21.8 | 18.8 |
| change of weight (ppm) | 7.2 | 8.4 | 9.8 | 8.5 | 9.1 | 5.5 | 6.2 | 8.2 | 15.7 | 8.8 | 6.2 |

TABLE 8

Change of K content

| | Sample No. | | | | | | | | | | |
|---|---|---|---|---|---|---|---|---|---|---|---|
| | 48 citric acid | 49 citric acid | 50 citric acid | 51 dihydroxy succinic acid | 52 malic acid | 53 oxalic acid | 54 oxalic acid | 55 sulfuric acid | 56 hydrochloric acid | 57 nitric acid | 58 phosphoric acid |
| temperature of solution | room temperature | room temperature | room temperature | room temperature | room temperature | room temperature | room temperature | room temperature | room temperature | room temperature | room temperature |
| concentration of acid | 1% | 3% | 5% | 5% | 5% | 3% | 5% | 5% | 5% | 5% | 5% |
| washing process in water | 30 times | 30 times | 30 times | 30 times | 30 times | 30 times | 30 times | 30 times | 30 times | 30 times | 30 times |
| Before acid cleaning process (ppm) | 1.5 | 1.6 | 1.3 | 1.4 | 1.2 | 1.3 | 1.3 | 3.0 | 3.5 | 3.2 | 2.9 |
| After acid cleaning process (ppm) | 36.8 | 37.2 | 36.8 | 37.5 | 37.1 | 29.7 | 30.4 | 92.6 | 94.7 | 99.5 | 3.5 |
| change of weight (ppm) | 35.3 | 35.6 | 35.5 | 36.1 | 35.9 | 28.4 | 29.1 | 89.6 | 91.2 | 96.3 | 0.6 |

As for the Ca content, the amount of weight change (7.2 ppm to 9.8 ppm) of each of samples No. 37 to 41 according to the examples of the present invention are larger than those (5.5 ppm to 6.2 ppm) of samples No. 42 and 43 cleaned with oxalic acid according to the comparative examples, so that it has been confirmed that a calcium removing effect is high when carboxylic acid containing the hydroxyl group is used.

As for the K content, the amount of weight change (35.33 ppm to 36.1 ppm) of each of samples No. 48 to 52 according to the examples of the present invention are larger than those (28.4 ppm to 29.1 ppm) of samples No. 53 and 54 cleaned with oxalic acid according to the comparative examples, so that it has been confirmed that a potassium removing effect is high when carboxylic acid containing the hydroxyl group is used.

Furthermore, in either case, as the concentration of the citric acid aqueous solution is increased, the weight changes of Ca and K are increased, and it has been confirmed that the removing effect is improved.

WORKING EXAMPLE 7

It was examined how the component concentration in the organic waste was changed when the organic waste is immersed in the different kind of acid, in addition to the step of immersing the organic waste in the carboxylic acid aqueous solution. The result is shown in table 9.

TABLE 9

Measuring result showing change of content of components due to difference of acid cleaning process
Solution temperature 80° C.

| name of component | citric acid 3% → oxalic acid 5% | citric acid 5% → oxalic acid 3% | citric acid 5% → oxalic acid 5% | oxalic acid 3% → citric acid 5% | oxalic acid 5% → citric acid 3% | oxalic acid 5% → citric acid 5% | citric acid 3% + oxalic acid 5% | citric acid 5% + oxalic acid 3% | citric acid 5% + oxalic acid 5% | citric acid 80° C. 5% |
|---|---|---|---|---|---|---|---|---|---|---|
| SiO$_2$ | 99.50 | 99.40 | 99.50 | 99.30 | 98.90 | 99.20 | 99.10 | 98.90 | 99.10 | 99.40 |
| Al$_2$O$_3$ | 0 | 0.034 | 0.022 | 0.016 | 0.046 | 0.039 | 0.034 | 0.022 | 0.039 | 0.034 |
| MgO | 0.046 | 0.015 | 0.032 | 0.016 | 0 | 0.023 | 0.022 | 0.021 | 0.029 | 0.037 |
| Na$_2$O | 0.085 | 0.067 | 0.10 | 0.068 | 0.062 | 0.079 | 0 | 0.061 | 0 | <0.01 |
| P$_2$O$_5$ | 0.073 | 0.086 | 0.072 | 0.081 | 0.046 | 0.055 | 0.086 | 0.110 | 0.088 | 0.250 |
| S | 0.013 | 0.013 | 0.031 | 0.027 | 0.028 | 0.081 | 0.110 | 0.038 | 0.035 | 0.007 |
| K$_2$O | 0.019 | 0.010 | 0.011 | 0.012 | 0.010 | 0.010 | 0.035 | 0.036 | 0.038 | 0.059 |
| CaO | 0.130 | 0.100 | 0.093 | 0.350 | 0.370 | 0.380 | 0.440 | 0.530 | 0.510 | 0.160 |
| MnO | 0 | 0.012 | 0.010 | 0.017 | 0.025 | 0.020 | 0.022 | 0.034 | 0.027 | 0.020 |
| Fe$_2$O$_3$ | 0.040 | 0.100 | 0.034 | 0.074 | 0.370 | 0.066 | 0.078 | 0.220 | 0.049 | 0.044 |
| BaO | 0.02 | 0.031 | 0.019 | 0 | 0.025 | 0.019 | 0.029 | 0 | 0 | <0.01 |
| C | 0.07 | 0.05 | 0.06 | 0.06 | 0.08 | 0.08 | 0.06 | 0.05 | 0.06 | |
| specific procedure | Immersion in the citric acid aqueous solution at 80° C. for 30 minutes→ washing in water 3 times→ immersion in oxalic acid aqueous solution at 80° C. for 30 minutes→ washing in water 3 times | | | Immersion in the oxalic acid aqueous solution at 80° C. for 30 minutes→ washing in water 3 times→ immersion in citric acid aqueous solution at 80° C. for 30 minutes→ washing in water 3 times | | | Immersion in a mixture of the citric acid and oxalic acid aqueous solutions at 80° C. for 30 minutes→ washing in water 3 times | | | |

As can be clear from the result in table 9, as compared with the one-stage acid cleaning method in which the organic waste is immersed in the citric acid aqueous solution, according to a two-stage cleaning method in which the organic waste is immersed in the oxalic acid aqueous solution as well as in the citric acid aqueous solution, a phosphorous component and a potassium component are effectively removed. The specific procedure of the two-stage acid cleaning process actually performed were as follows.

(a) Immersion in the citric acid aqueous solution→washing in water→immersion in oxalic acid aqueous solution→washing in water
(b) Immersion in the oxalic acid aqueous solution→washing in water→immersion in citric acid aqueous solution→washing in water
(c) Immersion in a mixture of the citric acid and oxalic acid aqueous solutions→washing in water Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The high-purity amorphous silica produced by the method of the present invention can be advantageously applied to a cement admixture, tire rubber reinforcement, soluble fertilizer, cosmetic raw material, coating material and the like.

What is claimed:
1. A production method of amorphous silica comprising:
a step of preparing organic waste containing silicon oxide as a starting material;
a step of immersing said organic waste in a carboxylic acid aqueous solution having a hydroxyl group and immersing said organic waste in a different acid than said carboxylic acid, wherein said different acid comprises oxalic acid;
a step of washing said organic waste in water; and
a step of heating said organic waste in an air atmosphere.
2. The production method of the amorphous silica according to claim 1, wherein
said carboxylic acid comprises citric acid.

* * * * *